(12) United States Patent
Kaminka et al.

(10) Patent No.: US 10,025,798 B2
(45) Date of Patent: Jul. 17, 2018

(54) LOCATION-BASED IMAGE RETRIEVAL

(71) Applicant: Bar-Ilan University, Ramat Gan (IL)

(72) Inventors: Gal Kaminka, Kfar Saba (IL); Shahar Moshe Kosti, Hertzliya (IL); David Sarne, Tel-Aviv (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 14/767,368

(22) PCT Filed: Jan. 14, 2014

(86) PCT No.: PCT/IL2014/050042
§ 371 (c)(1),
(2) Date: Aug. 12, 2015

(87) PCT Pub. No.: WO2014/108907
PCT Pub. Date: Jul. 17, 2014

(65) Prior Publication Data
US 2017/0206222 A1    Jul. 20, 2017

Related U.S. Application Data

(60) Provisional application No. 61/751,972, filed on Jan. 14, 2013.

(51) Int. Cl.
*G06F 17/30* (2006.01)
*G06T 7/70* (2017.01)
*H04N 7/18* (2006.01)

(52) U.S. Cl.
CPC .... *G06F 17/30241* (2013.01); *G06F 17/3028* (2013.01); *G06F 17/30061* (2013.01);
(Continued)

(58) Field of Classification Search
CPC . G06F 17/30; G06F 17/30061; G06F 17/3028
(Continued)

(56) References Cited

U.S. PATENT DOCUMENTS 6,342,889 B1 * 1/2002 Callahan ............ G06F 3/04815
345/427
2007/0258642 A1    11/2007    Thota
2010/0295850 A1    11/2010    Katz et al.

FOREIGN PATENT DOCUMENTS

GB        2424730        10/2006
KR     20050000225        1/2005

OTHER PUBLICATIONS

Location and Orientation Based Queries on Mobile Environments; International Journal of Computer Information Systems and Industrial Management Applications. ISSN 2150-7988 vol. 3 (2011).
(Continued)

*Primary Examiner* — Isaac M Woo
(74) *Attorney, Agent, or Firm* — Roach Brown McCarthy & Gruber, P.C.; Kevin D. McCarthy (57) ABSTRACT

A method and a for location-based image retrieval, the method comprising using at least one hardware processor for: receiving N-dimensional coordinates of a point of interest, wherein N is an integer equal to or larger than 2; and retrieving one or more digital images in which the point of interest is visible. In addition, a computer program product configured to execute this method.

14 Claims, 4 Drawing Sheets

(52) U.S. Cl.
CPC ............ *G06F 17/3087* (2013.01); *G06T 7/70* (2017.01); *H04N 7/183* (2013.01)

(58) Field of Classification Search
USPC .................................................. 707/600–899
See application file for complete search history.

(56) References Cited

OTHER PUBLICATIONS

The Point to Discover Geowand; In Adjunct Proceedings of the 9th International Conference on Ubiquitous Computing. pp. 3-10. Sep. 2007.

Ranking Mechanisms for Image Retrieval Based on Coordinates, Perspective and Area; retrieved from the internet http://daim.idi.ntnu.no/masteroppgaver/004/4646/masteroppgave.pdf Dec. 31, 2010.

Scalable Target Detection for Large Robot Teams; Proceedings of the 6th international conference on Human-robot interaction, HRI '11, ACM (New York, NY, USA). pp. 363-370. 2011.

* cited by examiner

LOCATION-BASED IMAGE RETRIEVAL

CROSS REFERENCE TO RELATED APPLICATIONS

This patent application is a U.S. National Phase filing of commonly owned PCT Application No. PCT/IL2014/050042, filed Jan. 14, 2014, which is based on and claims the benefit of the filing date of U.S. Provisional Patent Application Ser. No. 61/751,972, filed Jan. 14, 2013, both which are incorporated herein by reference in their entirety.

FIELD OF THE INVENTION

The invention relates to location-based image retrieval.

BACKGROUND OF THE INVENTION

Sophisticated digital cameras have become extremely widespread in recent years. These cameras produce an unimaginable quantity of digital images every day, with many of these images being uploaded to various online image hosting providers, such as Flickr, Google+, Facebook, Instagram and others.

Searching through these images is not a trivial task. Since many digital images are accompanied by location (e.g. GPS) data, it has been suggested to search for images by location.

Still, there is a long-felt need in the field of image retrieval for enhanced methods of image storage, analysis, retrieval, grouping, ranking and more.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

One embodiment provides a method for location-based image retrieval, the method comprising using at least one hardware processor for: receiving N-dimensional coordinates of a point of interest, wherein N is an integer equal to or larger than 2; and retrieving one or more digital images in which the point of interest is visible.

Another embodiment provides a computer program product for location-based image retrieval, the computer program product comprising a non-transitory computer-readable storage medium having program code embodied therewith, the program code executable by at least one hardware processor for: receiving N-dimensional coordinates of a point of interest, wherein N is an integer equal to or larger than 2; and retrieving one or more digital images in which the point of interest is visible.

In some embodiments, the method further comprises using said at least one hardware processor or a different at least one hardware processor for: receiving multiple digital images and N-dimensional mapping data associated with each of the multiple digital images; and for each of the digital images, computing a field of view polytope based on the N-dimensional mapping data.

In some embodiments, the retrieved one or more digital images are those of the multiple digital images in which the point of interest is contained within the field of view polytope.

In some embodiments, the field of view polytope is devoid of a visually-occluded space.

In some embodiments, the method further comprises using said at least one hardware processor or a different at least one hardware processor for computing, for each of the digital images, a discrete oriented polytope (DOP) which bounds the field of view polytope, wherein the retrieved one or more digital images are those of the multiple digital images in which the point of interest is contained within the DOP.

In some embodiments, the N-dimensional mapping data comprises: camera location data, camera orientation data and a distance measurement from a camera.

In some embodiments, the N-dimensional mapping data associated with each of the multiple digital images is contained within an image file of each of the multiple digital images.

In some embodiments, the method further comprises using said at least one hardware processor or a different at least one hardware processor for: generating a spatial index of the N-dimensional mapping data; and storing the N-dimensional mapping data and the spatial index in a database, wherein said retrieving comprises searching the database using the spatial index.

In some embodiments, the method further comprises using said at least one hardware processor for grouping the one or more digital images according to different view angles of the point of interest.

In some embodiments, said grouping comprises dividing a space around the point of interest into sectors, and determining, based on the camera location data, in which of the sectors each of the one or more digital images was taken.

In some embodiments, the method further comprises using said at least one hardware processor for ranking the one or more digital images according to at least one criterion selected from the group consisting of: an area size visible in each of the one or more digital images; a distance from the point of interest at which each of the one or more digital images was taken; and a centeredness of the point of interest in each of the one or more digital images.

In some embodiments, the method further comprises using said at least one hardware processor or a different at least one hardware processor for at least one of: computing the area size based on the distance measurement from the camera of each of the one or more digital images; computing the distance from the point of interest based on the distance measurement from the camera of each of the one or more digital images; and computing the centeredness of the point of interest based on two-dimensional coordinates of the point of interest in each of the one or more digital images.

In some embodiments, the program code is further executable for computing, for each of the digital images, a discrete oriented polytope (DOP) which bounds the field of view polytope, wherein the retrieved one or more digital images are those of the multiple digital images in which the point of interest is contained within the DOP.

In some embodiments, the program code is further executable for: generating a spatial index of the N-dimensional mapping data; and storing the N-dimensional mapping data and the spatial index in a database, wherein said retrieving comprises searching the database using the spatial index.

In some embodiments, the program code is further executable for grouping the one or more digital images according to different view angles of the point of interest.

In some embodiments, the program code is further executable for ranking the one or more digital images according to at least one criterion selected from the group consisting of: an area size visible in each of the one or more digital images; a distance from the point of interest at which each of the one or more digital images was taken; and a centeredness of the point of interest in each of the one or more digital images.

In some embodiments, the program code is further executable for at least one of: computing the area size based on the distance measurement from the camera of each of the one or more digital images; computing the distance from the point of interest based on the distance measurement from the camera of each of the one or more digital images; and computing the centeredness of the point of interest based on two-dimensional coordinates of the point of interest in each of the one or more digital images.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Location-based image retrieval is disclosed herein. N-dimensional coordinates of a point of interest (POI) are received, and one or more digital images in which the point of interest is visible are retrieved. N is an integer equal to or larger than 2. Accordingly, 2D, 3D or higher dimensional embodiments are explicitly intended herein. To provide a simpler disclosure, however, an N-dimensional phrasing is used herein.

Present embodiments may allow storing, retrieving and prioritizing one or more images (which may be still images or video frames) of the POI, which is an arbitrary target point in space, given a large set of images taken in arbitrary locations, and pointing in arbitrary directions.

In addition, a method is disclosed for deciding where, in a given general target area, it is useful to take snapshots, so that as many points as possible are visible in the snapshots.

Present embodiments may be divided into three sets of techniques, which may be used in part or as a whole. First, a set of techniques for storing images (alongside additional information) in a database that allows later retrieving given an arbitrary target point (i.e. the POI). This set of techniques may be executed using a first computerized device comprising at least one hardware processor. Second, a set of techniques for searching through the database, given a target point, to determine all images that may contain an image of the point (these matching images are collected in a results set). And third, a set of techniques for prioritizing (also "ranking") the results set, so that images that optimize some application-specific criteria are given a higher priority than others. The second and third sets of techniques may be executed using a second, different computerized device comprising at least one hardware processor.

The digital images and their additional information may be produced by one or more devices. One example is a device which both records images and gathers mapping data of its surroundings. The mapping data may include a scaled model of the environment in N dimensions, generated by measurements (e.g. range scanner measurements) which the device takes. In many applications, the map is two-dimensional (e.g., in architecture maps). In other cases, the map is three-dimensional (e.g., in 3D interior design and modeling). The device uses one or more sensors to measure distances, or any other information based on which it builds a map of the environment as it is positioned in various locations in the environment (for example, it might be positioned by visitors to the area or by a surveyor), or actively moved around it (connected to a robot, carried by a person or animal, flying through it, etc.). As the device is building a map, it takes pictures (i.e. images), and/or records a video made of multiple frames (multiple images), by one or more cameras. Therefore, as the map is incrementally built, the device is also generating a stream of images which capture the view from the device, of the environment, as the mapping process took place. It is assumed here that the cameras are co-located with the mapping device; that they lie within fixed known distances and orientations to the device.

Another example is a device which records images, and a separate device which maps the environment. Alternatively, the map may be pre-provided. In this scenario, there exists a certain link between each of the images and the map, such that suitable mapping data may be attributes to every image.

At any point during the mapping process, or after the mapping is complete, it is sought to be able to specify a point in the N-dimensional model. The task is to find all images in which this point is visible. Optionally, these relevant images may be ranked such that images that optimize certain application-specific criteria are prioritized over images that do not.

Image Storage

Multiple images may be received and stored with additional data, either inside each image file or in some association with the image file. These images may have been recorded using any type of imaging device adapted to capture images and store them digitally (i.e. a digital camera). Examples include consumer digital cameras recording visible light, task-specific cameras recording visible and/or invisible (e.g. infrared, ultraviolet light), medical imaging devices recording various wavelengths in the electromagnetic spectrum or ultrasound, etc. The additional data may include, for example, mapping data containing one or more of camera location data, camera orientation data and a distance measurement from a camera. The additional data may further include a field-of-view polytope. This requires combining sensory data from multiple sensors, such as a camera and a mapping device (or a pre-provided map).

The sensors are either producing output in fixed intervals (together), or use a synchronized clock to label the output data with timestamps. For simplicity, referred to herein are the major data categories: image (camera) and position (position, orientation, FOV polytope).

To combine the two data categories, it is first found which one is produced in a lower rate (the "slow" sensor). Then, each "slow" item may be matched with the nearest (in terms of timestamp) "fast" item. The unmatched data (remaining items from the "fast" sensor) can either be discarded, or added as additional entries to the image database.

For each image, one or more of the following are stored:

Camera location and orientation in the N-dimensional model. For example, in three dimensions, this corresponds to location specified in coordinates (x,y,z) and orientation (heading, pitch, roll). In two dimensions, the location is given as a pair of coordinates and another angle (heading).

FOV (field-of-view) N-dimensional polytope (in three dimensions, a polyhedron; in two dimensions, a polygon).

The computed N-dimensional volume (in two dimensions: area) of the FOV polytope; optional.

The bounding discrete oriented polytope (DOP) of the FOV polytope (in three dimensions, bounding box or AABB—Axis-Aligned Bounding Box; in two dimensions, a bounding rectangle); optional.

Timestamp (the time in which it was taken); optional.

Linear and angular velocity in the N dimensions; optional.

Camera identifier, other sensors identifiers; optional.

The camera location and orientation are given. When only partial coordinates are known, the rest may be approximated or constants used for them.

The FOV polytope may be computed based on the local map, i.e., the current knowledge of the map from the perspective of the mapping device, translating for the relative position of the camera that took the image. The FOV polytope bounds, as exactly as possible, the N dimensional hyperplanes that lie at the edges of visibility from the camera in question. To do this, it uses knowledge from the map as to what occludes the view from the camera location. It also uses a parameter, dependent on the camera and optionally provided by a user, of the camera's maximum range. The polytope's vertices are limited in distance from the location of the camera by this maximum range. If the FOV polytope is larger than the actual space covered by the camera, the FOV may be clipped such that it matched that space; this may be useful in case the camera and the mapping device are not perfectly aligned.

Given the FOV polytope, its volume and DOP are computed using standard algorithms. This may be explained using examples:

For instance, in three dimensions, the FOV polytope is a polyhedron that bounds the volume of space that is visible from the camera location, up to the camera's range. If no object is in this space, then the three-dimensional polyhedron will have sides equal to the maximum range. If an object occludes a portion of the space, then some of the sides—those that lie on the edges of the object, will be closer to the camera location than the maximum range. Points in the space occluded to the camera by the object will not be in the polyhedron.

In two dimensions, the FOV polytope is a polygon that circumscribes the area that is visible from the camera location, taking occluding objects into account, and up to the maximum range of the camera, as determined by the parameter set by the user.

Constructing the FOV polytope from range scanner readings:

For a camera position P, orientation O and map points, up to distance of maximum range from P, or up to an object sensed by the device, $[r_1, \ldots, r_n]$ given in polar coordinates.

1. First, if needed, transform the readings to cartesian coordinates, resulting in a list of points in local coordinate system, where the origin is the camera location P.
2. Then, project the points to the global coordinate system by rotating by O and adding P to each point, resulting in a list of points $[p_1, \ldots p_n]$.
3. The resulting FOV polytope is defined by $[P, p_1, \ldots, p_n, P]$.

Some or all of this information gets stored with each image.

The set of points $[r_1, \ldots r_n]$ can be computed, for example, in one of two ways:

1. First, it may be computed from the map itself. Given the position of the camera P, one can draw a virtual line (ray-trace) from P up to the maximum range given to us. At that point, if a marked point in the map (i.e., the map shows clear space up to this point) has not yet been hit, then this becomes a point $r_x$ for the set of points. Else, if a marked object is hit earlier (shorter distance from P), then the position of this object becomes the point $r_x$. This may be repeated at the angular velocity needed—i.e., the more virtual lines one draws, the better the accuracy of the polytope.
2. Second, it is much faster to receive this information directly from the device's sensors. For instance, a laser line scanner (e.g. Lidar) returns measurements of distance with the origin set at the scanner position. The measurements' polar coordinates from the camera position P can be easily computed given the known position of P, relative to the device, and the specifications of the laser device, which provide information about the number of measurements and the angle of each.

When the storage device is limited in size or performance, the number of stored images may, in some embodiments, be actively limited. The decision on how many images will be stored for each polytope may based on one or more of the following factors:

1. The difference between the first and last image that are associated with the polytope, as measured by some user-specified way (e.g., the amount of overlap in local features, such as those computed by standard feature detection methods; the magnitude of the mean optical flow vector; the difference between the color histograms; and/or the like). The greater the difference, the more images should be stored. The images stored should be equally divided in terms of the time they were taken along the time interval in which the polytope was stored.
2. Speed of movement/rotation. If available, the values of these parameters are supplied by the device carrying out the mapping. The greater the speed of movement, the more images should be stored for each polytope.
3. Blocked areas along the diagonal—by calculating the "seen space" along the diagonal of an image (image processing, requires measuring the vertical distance of non-blocked part of the image along the diagonal). The greater the level of blocking, the more images should be stored for each polytope.

All the image data (which includes, for each image, the actual picture as well as the additional information discussed above) may be saved in a database of images. By storing the auxiliary information with each image, significant computation time is saved when responding to queries.

There is, of course, an issue of how this database is structured. An unstructured collection of all images is one possibility, in a certain embodiment. This may require the entire collection to be processed for each query of a point of interest.

Another possibility, in a different embodiment, is to use a spatial access method (memory-based, disk-based or hybrid)

as the basis for the representation. This reduces the number of images that are processed in response to each query. This possibility is much more efficient, and thus more appropriate as the number of images to be stored is larger. In this case, the DOP and FOV polytope may be used as the basis for indexing. Namely, they may serve as a spatial index of the database.

There are many different data structures in the art which may be used as the basis for the representation, with some necessary adaptation. Examples of such spatial indices include Quadtree and R-Tree, and related data-structures for two-dimensional spaces; Octree and KD-Tree and similar data-structures for three dimensional cases; and PR-tree, X-tree, R+ tree and Hilbert R-tree and related data-structures for the general N-dimensional case.

A key requirement of these data structures is that they store the image and associated data using the FOV or the DOP as the index. And yet they must be searchable using a given point (i.e., they answer the following query: does the point lie within the FOV or within the DOP?).

R-Tree is discussed herein as an example of how to adapt a spatial data structure to the requirements of the image database. Similar processes will be needed to be carried out with any other spatial data structure. In the two-dimensional R-tree, the bounding rectangles of all polygons (i.e., the DOP) is stored. With each such polygon, the associated image and some or all of its associated data (including the FOV) may be stored. Upon a query for a target point p, the R-tree is first used to search and retrieve the images whose bounding rectangles (DOP) contain the target point p. Then, a polygon containment algorithm (discussed below) may be executed for further filtering.

Figure 4:
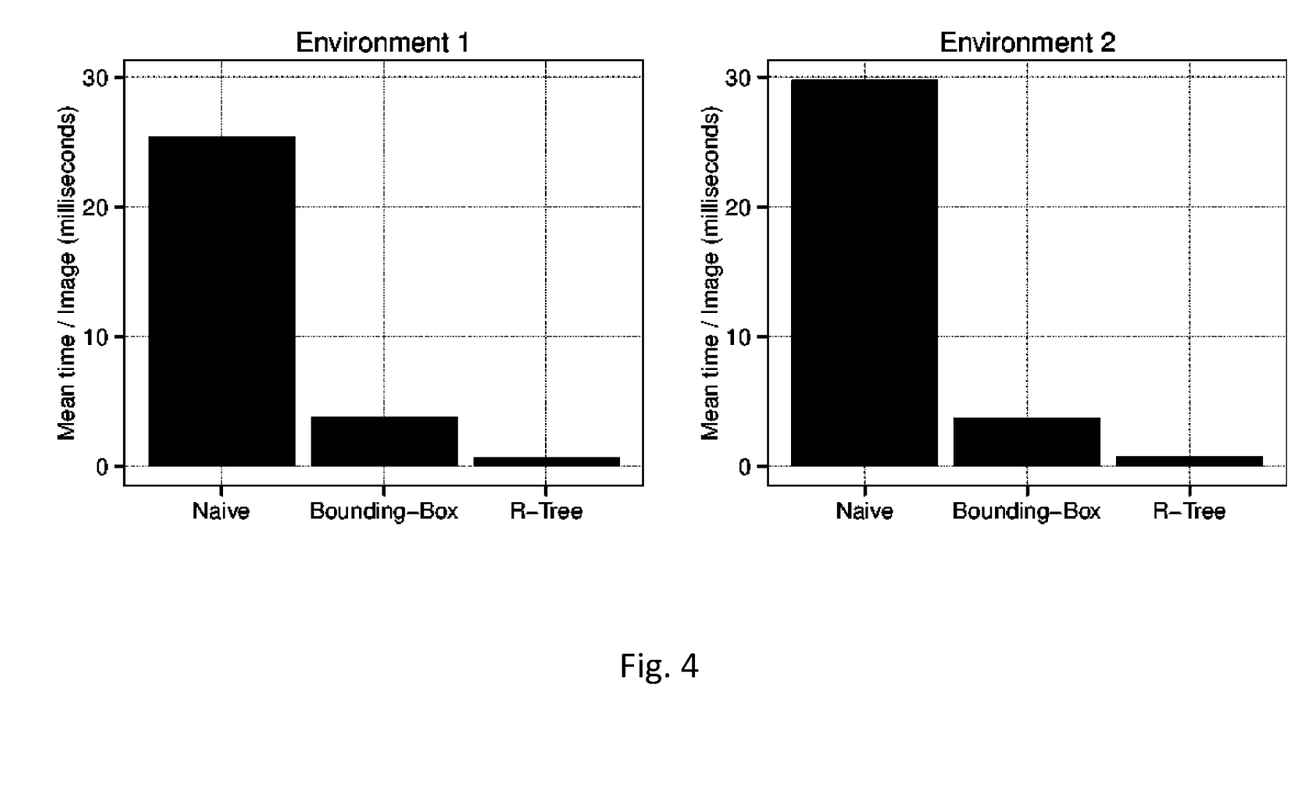
FIG. 4 shows two graphs illustrating image retrieval times in the first and second environments.

In experiments conducted by the inventors, use of this method lead to retrieving all relevant images for an arbitrary query point p, in 1-2 milliseconds (ms). This has been compared to over 10 ms in naive (unstructured) methods. See FIG. 4 which shows retrieval times across the two environments, discuss below in the "experimental results" section.

Image Query

The key task of this technique is to determine whether a point p (the POI) lies in a polytope. If it does, then necessarily the POI is visible in the image(s). For each point of interest (given in N-dimensional coordinates) received from the user, all images that cover it are queried, and processed as described above (grouping and ranking). The result is the retrieval of one or more images in which the POI is visible. Namely, the FOV polytope of these one or more images is devoid of visually-occluded space which existing in the camera's surroundings.

First, the database query mechanism is used to retrieve all images (and their associated information) that match the query POI p. In other words, all images whose associated DOP contain p are retrieved. Then, a "ray-casting" algorithm (a simple solution to the "point in polytope" problem, known in the art also as the "even-odd algorithm") to determine whether p lies within the FOV polytope. This is thus a two step algorithm: (1) do retrieval based on p within DOP; (2) do filtering based on p within FOV.

Alternatively, the database query mechanism may be used to directly retrieve all images whose associated FOV polytope contain p, skipping the DOP retrieval step. Although this method is more time consuming, it may be preferred when the DOP is not stored in the database.

Consider the case when a user requests images showing a location, but no image covers it. This could happen if while recording the images, the POI was obstructed by an object. The straightforward approach in this case would be to return no images, and let the user fine-tune the point selection. However, this would only be one way of responding to this. There are others, discussed below:

In an embodiment all FOV polytopes are scaled up by a constant factor, to allow a larger area to be included in the "point in polytope" test. This allows some more flexibility when selecting unknown areas. The boundary of this larger area may be found by either using the map if represented as an occupancy grid, or performing edge detection on the map image itself. Then, two options exist: either all images that cover the boundary (from all sides) may be retrieved, or only those which cover the nearest boundary to the POI. This approach is general and applicable to N-dimensional cases, too.

Prioritizing the Images

After finding all images that cover the point of interest, they may be prioritized as described below.

As described above, the images may be grouped by sectors and then ranked. The grouping process may be extended, in some embodiments. The division to sectors around the POI may be done in a fixed manner, optionally regardless of the POI location and the number of images that cover it. One or more of the following attributes may be considered in order to provide better view points for the selected points of interest. Below, 2D terms (such as area) are used for simplicity, but they should be understood also as representing their N-dimensional equivalents (e.g., area as a term also represents volume in three dimensions, etc.):

Area—what size of area does the image covers?
Distance—what is the image distance from the POI?
Is the image centered (directed towards the POI)?
Available data—how many images cover the POI? Are there any areas with more images than others?
Surroundings—is the POI located in a small room or a large open space?
Visibility—are there any areas from which there is clear sight of the POI?
Visual characteristics—is the image blurred or in-focus? Is it darker/brighter? Is the contrast within some specifications?
Image meta-data—When was the image taken? Was the camera moving (and at what velocity/acceleration)? What was the focus length, lens type, shutter speed (or frame rate, in images originating with a video)?

Each of these attributes may be used to dynamically group the images, either separately or in combination.

Ranking Process

The ranking process described above may also be extended, in some embodiments. The present approach may rank all images using a fixed set of weights. An alternative approach includes adjusting the weights dynamically, so that the highest-ranked images are better suited to the environment and user preferences.

We relate to the Recommender Systems theory, as known in the art, and consider two types of filtering:

Content-based filtering—by considering the attributes of selected points-of-interest and images: position, area, heading angle, view angles and other attributes as described above in "grouping process". This way, one may understand which attributes are important than other, and build a model of user preferences.

Collaborative filtering—by allowing users to rate the images selected by the system, one can improve the above model. The ratings would apply to the same set of attributes mentioned above, thus providing another input source for the recommender system.

Displaying the Images

The present techniques may utilize, in some embodiments, a graphical user interface (GUI). In one embodiment, the GUI may be used to display 2D images that match a POI on a 2D map. In another embodiment, of the GUI may display 2D images that match a POI on a 3D map (model). The interface in this latter embodiment may provide, for example, one to four views:

Front, Side, Top—display the mapped environment using an orthographic projection. The user is able to perform the same operations as in the 2D map (drag, zoom, select).

Freeform—display the mapped environment using a perspective (realistic) projection. In addition to the operations of the other views, the user can rotate the point of view.

In this interface, changing the point of view in one view will affects all other views. This view layout is very popular in 3D applications, in particular CAD applications.

Other GUIs may be possible, too.

Applications

The present techniques may be used in a wide range of applications. Some examples are listed below:

Inspection for building deterioration, and/or general state of building and its contents, finding moss or signs of hazardous materials, fungi, termites, etc.

Inspection for security clearing, finding suspicious objects, (booby) traps.

Finding outdoor images of an arbitrary point in the world, given a database of crowd-sourced images taken in the area (e.g., tourist images). People are taking photos now more than ever, using advanced smart phones and sophisticated cameras. These pictures are taken in tours, ceremonies, playgrounds, parks and practically at any time and event during the day. New models of these smart phones and cameras are equipped with GPS systems as well as a motion sensor and/or accelerometer, a three-axis gyroscope and a proximity sensor. Similarly, new wearable products, such as the Google Glass and Meta ProGlasses, are capable of producing a high rate of images, altogether with the exact location of the image taken. Using these sensors, it is possible, in many cases to generate the visual polygon.

Finding images for a target point in the body, given an x-ray and/or any other medical imaging modality, from other databases of images. Recent advances in medical imaging have brought to a plethora of medically-targeted images of organs and body areas taken as standard medical procedures. For example, pill cameras, colonoscopy cameras and ultrasound are all producing numerous images in a single exam, with many images covering any single point, from various angles and locations and of different qualities.

In ship cleaning and inspection, need to examine for damage to the hull, and on insides.

In gas/gasoline tanks, including but not limited to trucks carrying gas, there is sometimes a need to open the tanks and inspect them. Given a camera that "tours" the inside (regardless of its technology), images of any specific location, from various angles, may be provided.

Surveillance cameras: Homes, offices and even whole streets are often covered by surveillance cameras. In such systems it is often possible to obtain the direction a camera is pointed to at any time. The present techniques or an adaptation thereof may be used to extract the visibility polygon discussed here. For instance, structure-from-motion machine vision algorithms, optic flow analysis algorithms, visual obstacle avoidance algorithms, may be suitable for this task. See, for example, Koray celik and Arun K. Somani, "Monocular Vision SLAM for Indoor Aerial Vehicles," *Journal of Electrical and Computer Engineering*, vol. 2013, Article ID 374165, 15 pages, 2013. doi:10.1155/2013/374165.

Use of depth cameras (such as the Kinect by Microsoft Corp. or the Leap Motion by Leap Motion, Inc), stereoscopic cameras, and/or additional depth-measurement devices may also provide this visibility polytope These products normally produce a distance value for each pixel in the image.

Car cameras and car warning and control systems: many cars nowadays are equipped with rear and front cameras taking continuous video, mostly for protecting the driver against crash for cash claims. Similarly, many cars are equipped with a warning and control system such as Mobileye and Awacs, that take continuous video from several cameras. Based on GPS readings and the car's progress direction and speed, the exact area stored in each image can be extracted in order to deduce the visibility polygon.

Laser rangefinders (e.g. Lidars) and other rangefinders may provide depth estimation, and hence the visibility polytope.

Aerial photography and surveillance: Some existing aerial photography and surveillance systems automate the selection and presentation of images based on a given target point. However, the present techniques may enable the selection only of images in which the target point is actually visible, and prioritize presentation of images appropriately.

Recording and Processing Images Under Constraints

In some cases, constantly transmitting a large amount of images may be undesirable, or even impossible. For example, low-bandwidth and high-latency communication channels, or areas where radio transmission is not possible (e.g. tunnels).

In these cases, another approach should be used to communicate between multiple imaging devices (e.g. autonomous robots, people carrying imaging devices, animals carrying imaging devices, etc.) and an OCU (Operator Control Unit). Presented herein is an approach in which imaging devices are used to explore an environment, while recording videos and/or still images in strategic locations. Then, the available recorded videos appear in a dedicated events view, to be processed by the operator.

Selective Image Recording:

The recorded images may cover the entire area, but less images than constant recording should be required. One can refer to two cases—offline (map is given in advance) and online (map is constructed in real-time).

Offline:

For environments where a map is given in advance, one can compute, in an embodiment, optimal recording positions before the environment is explored. This is a similar case to the "watchman route problem" or "multiple watchman route problem", for which polynomial-time approximation algorithms exist.

Online:

When the map is constructed in real-time, other strategies may be used in order to determine where to record videos. It may still be required that: a) images cover the entire area, and b) the number of recording locations is minimal.

Distance based—start a new recording every time a robot passes a certain distance. This strategy does not consider covered areas or other robots.

Operator based—intuitively, the operator should not wait for long videos to process. Since each video has a processing time (by the operator), the overall mission performance is affected by both the robots and the operator. Therefore, the location selection should relate to the operator performance (even by assuming a constant processing time). Obviously, the second requirement (minimal number of videos) should be weakened.

Event-Based Interface:

A GUI, in accordance with some embodiments, is composed of two primary displays, one for events display and the other for video display. The events display is used in order to queue up events for operator processing.

Events Display:

A primary display shows a global map with all robots and recorded videos. Map symbols indicate the represented object status. For example, each imaging device status (exploring, recording, etc.) is displayed as a different symbol. The robots may be represented as numbered circles, and recorded videos as color-filled rectangles.

Video Display:

A single video recording may be displayed along with a local map around the recorded area. Video playback may be done by using conventional control buttons (such as play and rewind).

Collaborative Interface for Multi-Device Search

An asynchronous and collaborative interface is disclosed herein, that enables users to view recorded imagery from multiple imaging devices and to mark locations on a map. In the context of a USAR (urban search and rescue) mission, the marked locations specify the approximate positions of disaster victims.

The input to the collaborative interface is an image database collected by one or more imaging devices, that provide an on-going stream of camera images and range scanner readings. The map is built from incoming range scanner readings using a technique called Simultaneous Localization and Mapping (SLAM). In all maps, white represents clear space, while black represents occupied space (walls, obstacles, etc.).

Image Database

Recorded images from all imaging devices are saved in a single database. The following values are kept with each image:

Camera location and orientation (heading) from the image recording time.

Visibility polytope where one vertex is at the camera location. The polytope indicates which part of the map or model or area is covered by the recorded image.

Navigating Between Images

Navigating between recorded images is done in the following manner. The user selects a point of interest on the map by clicking on it. The system finds all camera images that cover the selected point, and computes a utility value for each one. The highest-ranked image is displayed as the "Current Image". A subset of the highest-ranked images are displayed on the map, to provide other perspectives of the POI. All other images that cover the POI are also available for display, and presented as thumbnails ("Relevant Images").

After a POI was selected, the highest-ranked image is displayed in the upper right corner. A bold dot on the map represents the robot location while recording current image. Some other images are available for selection on the map, and displayed as smaller dots. All other images are displayed as thumbnails, below the current image.

Ranking Process

Normally, the selected point would be covered by many images, possibly too many. For example, in an experiment conducted by the inventors using multiple autonomous robots, a given point was covered by a range of 10-300 images. Most of these images are redundant, as they cover overlapping areas. In order to decrease the number of images the operator has to view, to conclude whether a victim is present at the point of interest, a ranking process may be applied. The whole process may be described as follows.

1. Find all images that cover the point of interest (p).
2. Group the images in sectors, by robot heading and sector resolution r.
3. For each sector, compute the utility value u of all images, and select the image with best u.

The ranking process produces two sets of images: "Best"—which contains the highest-ranked images of each sector, and "other"—which contains all other images that cover p. The highest-ranked image of best is displayed automatically, while the rest of the images are available for selection on the map. All images, including the other images, are displayed as thumbnails and ordered by their utility value.

Grouping

To provide the user with different perspectives of the POI, the images may be grouped by their view angle. For each image an angle θ is computed, between the POI and the robot location while recording. The images are then grouped in sectors, considering the θ value and the resolution parameter r.

Images are grouped in sectors by their θ angle, when the actual size of each sector is determined by r. Then one image may be picked from each group to the best group, and the rest may be gathered in the other group.

Utility Value Computation

In some embodiments, one or more of the following attributes may be considered when computing the utility value:

Maximize the image area size (formed by the range scanner readings). This area size may be computed based on the distance measurement from the camera of each of the one or more digital images.

Minimize the distance from the POI. This may be computed based on the distance measurement from the camera of each of the one or more digital images.

The image should be centered as much as possible. An image is said to be fully centered, if the camera faced directly towards the POI while recording. The centeredness of the POI may be computed, for a 2D image, by simply extracting the 2D coordinates of the POI in the image, and comparing them to the total width and length of the image. The following value may be sought to be minimized:

centered[image]=|heading[image]−θ|

Finally, a linear combination of the attributes is optionally used:

$$u[\text{image}] = w_1 \frac{\text{area}[\text{image}]}{\text{area}_{max}} + w_2 \frac{\text{distance}_{min}}{\text{distance}[\text{image}]} + w_3 \frac{\text{centered}_{min}}{\text{centered}[\text{image}]}$$

Appropriate weight values for the experiment were set in a pilot session. Note that the minima and maxima are computed over each group (sector) separately.

Image Selection History

In order to distinguish between visited and unvisited map areas, users are provided with a dedicated map layer to show previously seen images. Seen images are displayed on the map as light-blue polytopes. Viewing the same area multiple times will show up as darker color. The layer can be activated as necessary, and was activated by default in the reported experiment.

Experimental Results

Asynchronous Interfaces

To evaluate the present interface for USAR missions, it was compared with an existing asynchronous interface by Wang et al., originally called Image Queue. See Wang, H., Kolling, A., Brooks, N., Owens, S., Abedin, S., Scerri, P., ju Lee, P., Chien, S., Lewis, M., and Sycara, K. Scalable target detection for large robot teams. In *Proceedings of the 6th international conference on Human-robot interaction, HRI '11*, ACM (New York, N.Y., USA, 2011), 363-370. ACM ID: 1957792. Image Queue may be considered as part of the current state of the art of asynchronous interfaces for USAR missions, intended for a fully-autonomous multi-robot system. This interface was implemented as described by the authors, without any major changes. The main differences from the present interface include:

The map was not used to navigate between images, but only to identify and mark victims.

Navigating between images was done with two "Next" and "Previous" buttons, and the images were ordered by a utility value. The utility value was computed by the image area that was not already seen.

The thumbnails display images were ordered chronologically, to provide contextual information for the currently selected image.

The history map layer (mentioned in the previous section) was not provided, in order to stay as close as possible to the original interface. The layer is less significant for the automatic image queue interface, because visited areas are ranked lower than unvisited areas.

This interface is referred to as Best-First, since the next image to display is the "best" image, in terms of high utility value.

USARSim

The experiment was conducted in a simulated environment, generated by USARSim. USARSim is a high fidelity simulation package of robots and environments, based on the commercial Unreal Tournament game engine. It has been shown to accurately model robot behavior and sensors, in particular camera video and laser range scanner.

Recorded Data

Since both of the interfaces compared are asynchronous, and robots are assumed to be fully autonomous, the search mission could be changed to use pre-recorded data instead of "live" robots. Participants were given the entire map and image database of an environment, after a robot explored it. In addition, means for direct teleoperation were not provided, as it would be needed mainly for contingencies (e.g. stuck robots).

Environments

Two USAR environments were created, based on an office environment from the 2006 RoboCup Rescue competition finals. 20 human characters ("victims") in various postures were placed in each environment, in rooms and corridors. It was harder to spot victims in the second environment, since many victims were hidden behind obstacles (desks, cabinets, etc.). The difficulty level was measured by the percentage of images with any visible victims, and the average image space in each environment that was covered by a victim.

A simulated EyeDrivel robot was manually steered in each of the environments, while recording camera imagery, range scanner readings and odometry data. The Karto SDK2 by SRI was used in order to create a 2D map for the environments, from the recorded sensors data.

Participants 32 adult students were recruited from Bar-Ilan University in Israel, balanced for gender and field of study. Participants received a fixed show-up fee, along with a variable bonus for success.

Design

The experiment followed a between-subjects design, with each participant using only one of the interfaces. The order of environments was randomized, in order to minimize learning effect between sessions. The present interface is referred to as "Present" and the other as "Best-First".

To begin the experiment, participants read an instructions manual for the chosen interface, and performed a training session using a dedicated training map. Participants had to successfully mark three victims in the training session, in order to ensure they understand how to perform the missions to follow. Afterwards, participants were given 10 minutes in each environment to locate and mark as much victims as possible. The NASA-TLX questionnaire was given after each session.

Marks Processing

Prior to the experiment, a list of bounding boxes for victims was made for each environment. The bounding boxes indicate the map areas which are considered as victims, and were created by matching victim locations in the USARSim environment editor with the 2D map. Each mark made by the participants was assigned to the nearest bounding box. If the distance was less than 1 m, the mark was considered successful for that victim. We chose an accuracy value of 1 meter, and verified that it does not produce any anomalies with the experiment data.

Each mark was categorized to one of the following categories:

1. found—first successful mark for a victim.
2. duplicate—successful mark for a victim that was already marked.
3. false positive—a mark that could not be assigned to any of the victims.

In addition, we measured the number of false negatives, which considers victims that were seen by a participant at some time throughout the session, but were never marked.

Results

The marks results will now be presented, using the metrics defined above such as found victims. Then a more detailed overview of task progress over time is presented. Finally, a follow-up experiment is presented, that was conducted in order to understand some interesting and surprising patterns in the results.

Figure 1:
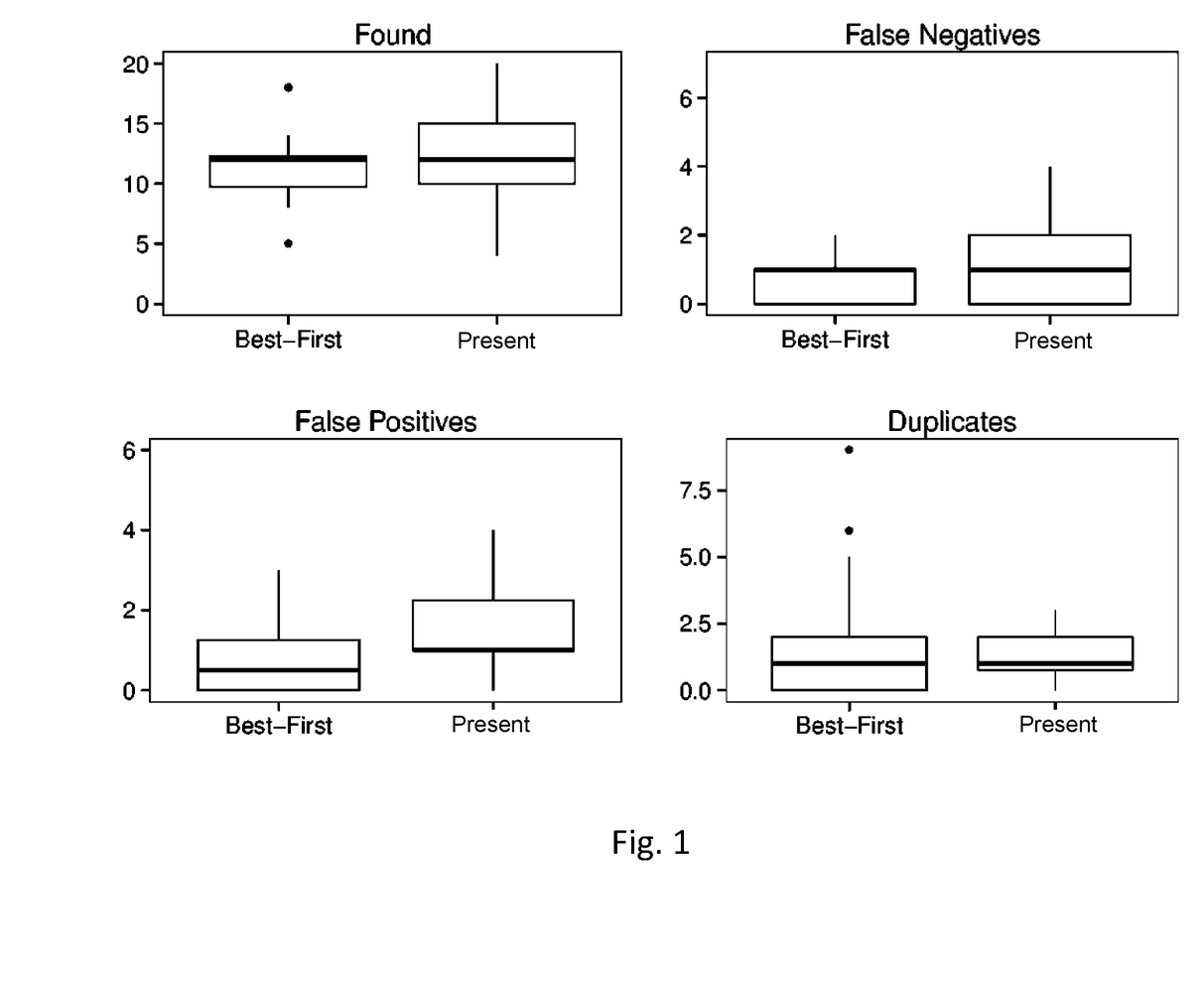
FIG. 1 shows four graphs illustrating marks results for a first environment.
Figure 2:
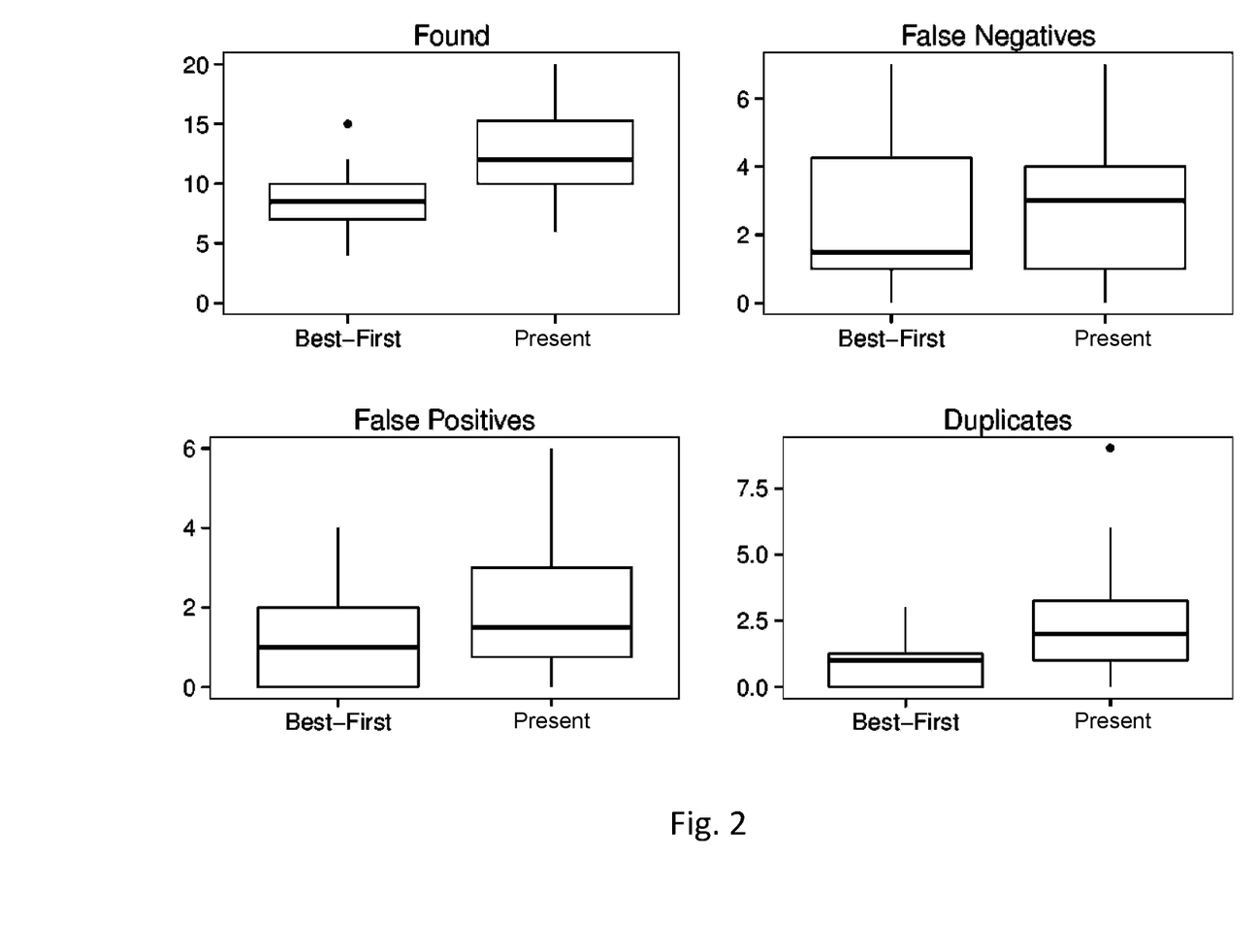
FIG. 2 shows four graphs illustrating marks results for a second environment.

Marks Results:

Mark results across both interface conditions (Present and Best-First) were compared using a two-sample t-test, with the null hypothesis that the mean result (e.g., the number of found victims) is equal. The overall aggregate results are shown in FIGS. 1 and 2. The horizontal axis specifies the interface (Present or Best-First), and the vertical axis specifies the number of marks.

Environment 1:

Participants in the Present and Best-First conditions found on average 12.4 and 11.5 victims respectively. We found no significant difference ($p>0.1$) in any of the measures, as can be seen in FIG. 1.

Environment 2:

Overall, participants in the Present condition had more success marking the victims, than those in the Best-First condition. As shown in FIG. 2, the number of found victims in the Present condition was significantly higher ($t(30)=-3.24$, $p<0.003$) finding 12.7 and 8.6 victims on average respectively. However, the number of duplicate marks was significantly higher ($t(30)=-2.31$, $p<0.028$), averaging at 2.4 and 0.9 respectively. The number of false positives and false negatives did not differ significantly ($t(30)=-1.44$, $p>0.16$). Note that the number of degrees of freedom (30), is due to the number of participants (and samples), which was 32.

Figure 3:
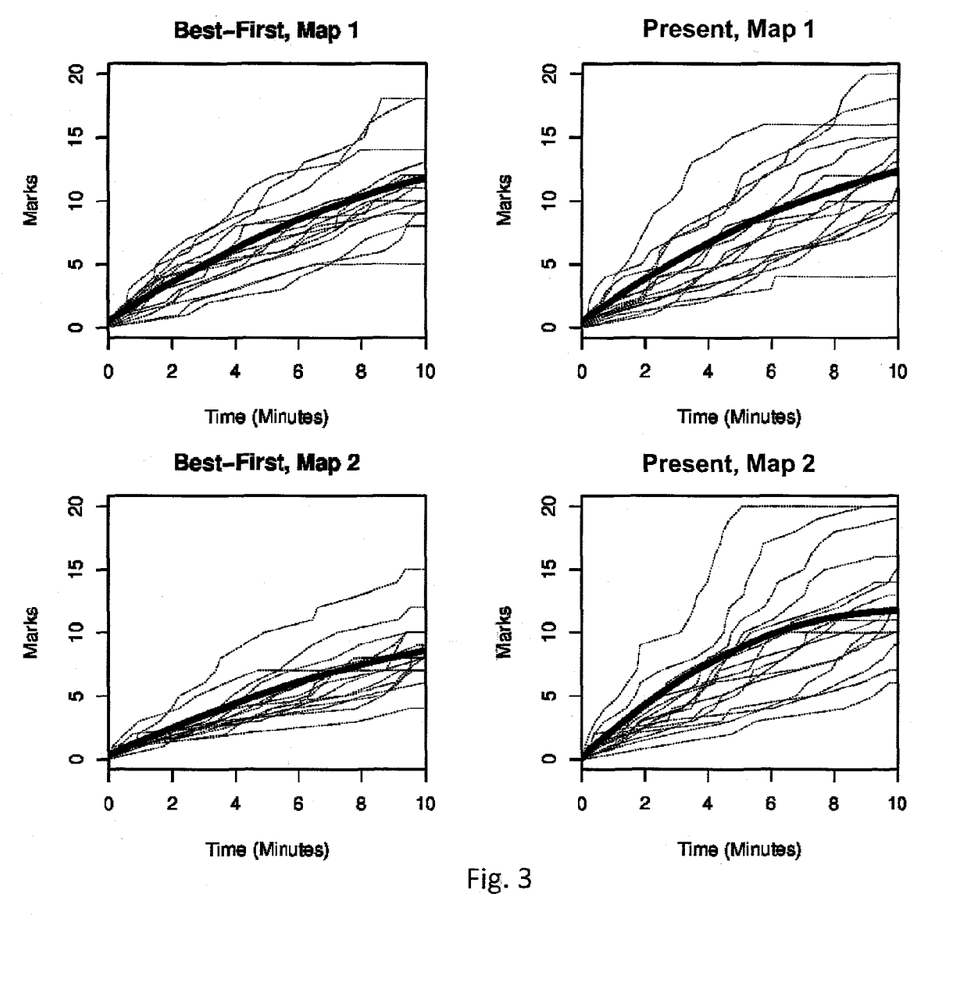
FIG. 3 shows four graphs illustrating task progress over time in the first and second environments (also "maps")

Task Progress:

FIG. 3 illustrates task progress over time for both of the environments, by displaying the number of correct marks of all participants throughout the session. In the second environment, the number of correct marks for the Present condition increased in a higher rate than the Best-First condition, as illustrated by the regression line. In addition, correct marks over time of participants in the Present condition had higher variance, compared to Best-First participants.

A collaborative user interface for multirobot search missions was presented above. The interface applies an advantageous operation scheme, in which the user determines how to view recorded images by selecting points of interest on a map. Images are grouped into sectors, and then ranked by utility value. The interface was compared to the current state of the art, and was found to perform better under certain conditions, in terms of higher number of found victims and lower number of missed victims. In general, participants in the Present condition relied mostly on the map for image navigation, suggesting that were satisfied by the recommended image (best image) most of the time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for location-based image retrieval, the method comprising using at least one hardware processor for:
   receiving N-dimensional coordinates of a point of interest, wherein N is an integer equal to or larger than 2;
   retrieving one or more digital images in which the point of interest is visible;
   receiving multiple digital images and N-dimensional mapping data associated with each of the multiple digital images, wherein the N-dimensional mapping data comprises: camera location data, camera orientation data and a distance measurement from a camera; and
   for each of the digital images, computing a field of view polytope based on the N-dimensional mapping data, wherein the retrieved one or more digital images are those of the multiple digital images in which the point of interest is contained within the field of view polytope; and
   ranking the one or more digital images according to at least one criterion selected from the group consisting of:
   an area size visible in each of the one or more digital images,
   a distance from the point of interest at which each of the one or more digital images was taken, and
   a centeredness of the point of interest in each of the one or more digital images.

2. The method according to claim 1, wherein the field of view polytope is devoid of a visually-occluded space.

3. The method according to claim 1, further comprising using said at least one hardware processor or a different at least one hardware processor for computing, for each of the digital images, a discrete oriented polytope (DOP) which bounds the field of view polytope,
   wherein the retrieved one or more digital images are those of the multiple digital images in which the point of interest is contained within the DOP.

4. The method according to claim 1, further comprising using said at least one hardware processor or a different at least one hardware processor for:
   generating a spatial index of the N-dimensional mapping data; and
   storing the N-dimensional mapping data and the spatial index in a database,
   wherein said retrieving comprises searching the database using the spatial index.

5. The method according to claim 1, further comprising using said at least one hardware processor or a different at least one hardware processor for grouping the one or more digital images according to different view angles of the point of interest.

6. The method according to claim 5, wherein said grouping comprises dividing a space around the point of interest into sectors, and determining, based on the camera location data, in which of the sectors each of the one or more digital images was taken.

7. The method according to claim 1, further comprising using said at least one hardware processor or a different at least one hardware processor for at least one of:
   computing the area size based on the distance measurement from the camera of each of the one or more digital images;
   computing the distance from the point of interest based on the distance measurement from the camera of each of the one or more digital images; and
   computing the centeredness of the point of interest based on two-dimensional coordinates of the point of interest in each of the one or more digital images.

8. A computer program product for location-based image retrieval, the computer program product comprising a non-transitory computer-readable storage medium having program code embodied therewith, the program code executable by at least one hardware processor for:
   receiving N-dimensional coordinates of a point of interest, wherein N is an integer equal to or larger than 2;
   retrieving one or more digital images in which the point of interest is visible
   receiving multiple digital images and N-dimensional mapping data associated with each of the multiple digital images, wherein the N-dimensional mapping data comprises: camera location data, camera orientation data and a distance measurement from a camera; and
   for each of the digital images, computing a field of view polytope based on the N-dimensional mapping data, wherein the retrieved one or more digital images are those of the multiple digital images in which the point of interest is contained within the field of view polytope; and ranking the one or more digital images according to at least one criterion selected from the group consisting of:

an area size visible in each of the one or more digital images, a distance from the point of interest at which each of the one or more digital images was taken, and a centeredness of the point of interest in each of the one or more digital images.

9. The computer program product according to claim 8, wherein the field of view polytope is devoid of a visually-occluded space.

10. The computer program product according to claim 8, wherein the program code is further executable for computing, for each of the digital images, a discrete oriented polytope (DOP) which bounds the field of view polytope, wherein the retrieved one or more digital images are those of the multiple digital images in which the point of interest is contained within the DOP.

11. The computer program product according to claim 8, wherein the program code is further executable for:

generating a spatial index of the N-dimensional mapping data; and storing the N-dimensional mapping data and the spatial index in a database, wherein said retrieving comprises searching the database using the spatial index.

12. The computer program product according to claim 8, wherein the program code is further executable for grouping the one or more digital images according to different view angles of the point of interest.

13. The computer program product according to claim 12, wherein said grouping comprises dividing a space around the point of interest into sectors, and determining, based on the camera location data, in which of the sectors each of the one or more digital images was taken.

14. The computer program product according to claim 8, wherein the program code is further executable for at least one of:

computing the area size based on the distance measurement from the camera of each of the one or more digital images;

computing the distance from the point of interest based on the distance measurement from the camera of each of the one or more digital images; and computing the centeredness of the point of interest based on two-dimensional coordinates of the point of interest in each of the one or more digital images.

* * * * *